Sept. 25, 1962     B. L. HENRY     3,055,287
BASTER OVEN

Filed Nov. 30, 1959     3 Sheets-Sheet 1

INVENTOR
BEULAH LOUISE HENRY

BY *John Gibson Semmes*

ATTORNEY

Sept. 25, 1962

B. L. HENRY 3,055,287

BASTER OVEN

Filed Nov. 30, 1959

INVENTOR
*BEULAH LOUISE HENRY*

BY *John Gibson Semmes*

ATTORNEY

INVENTOR
BEULAH LOUISE HENRY
BY John Gibson Semmes
ATTORNEY

_United States Patent Office_ 3,055,287
Patented Sept. 25, 1962

3,055,287
BASTER OVEN
Beulah Louise Henry, Hotel Seville, New York, N.Y.
Filed Nov. 30, 1959, Ser. No. 856,096
2 Claims. (Cl. 99—346)

The present invention relates to ovens, particularly a baster oven of the type having means for continuously discharging a basting fluid upon food being cooked.

There are in use numerous types of roaster ovens which employ electric or like heating means adjacently with respect to a heated container which defines a cooking area. More often than not, the heated container portion of such ovens is removable for cleaning purposes and similarly a removable top with transparent "window" portions may be provided. A principal shortcoming of such ovens relates to the complexity and expensiveness of the heating means wiring system. Yet another shortcoming relates to the difficulties involved in appropriately basting food being cooked in such ovens. Basting is usually accomplished difficultly and ineffectively by means of rubber-bulb syringe or like instrument, filled with basting fluid, which fluid is periodically and manually discharged upon the food being cooked. Needless to say, manual basting requires removal of the oven top or opening of the oven door with consequent heat loss and the limited capacity of the basting instrument prevents continuous and efficient basting of food.

This baster oven is characterized by the simplicity of its heating means, as well as by the unique baster well mounted in the heated container. This baster well permits continuous discharge of basting fluid through a discharge spout supported in the baster well and extending into the cooking area. The basting fluid falls directly upon and is deflected upon the food being cooked, percolates therethrough, and is recirculated by return-flowing from the bottom of the heated container into the baster well. Thus, a fowl and other types of food being cooked in the oven may be thoroughly and efficiently basted by the continuous percolation of the basting fluid through the food. Two independent heating coils are provided, one for separately heating the baster well and the other for the cooking area or the heated container. In the event of breakdown, a heating coil may be separately removed and replaced at slight cost. Since this baster oven employs no moving parts, it is anticipated that it will provide lifelong service at minimum cost.

Accordingly, it is an object of invention to provide an economical oven which is capable of continuously and efficiently basting food being cooked.

Another object of invention is to provide in a roaster oven means for basting continuously and efficiently food being roasted.

Another object of invention is to provide in a roaster oven, a baster well, together with means insertable in said well for discharging basting fluid therefrom and onto food being cooked.

Another object of invention is to provide a riffled oven cover which is capable of deflecting discharged basting fluid onto food being cooked.

Yet another object of invention is to provide in an oven the combination of heating means and continuous basting means.

Yet additional objects of invention will become apparent from the ensuing specification and attached drawings wherein.

Figure 1:
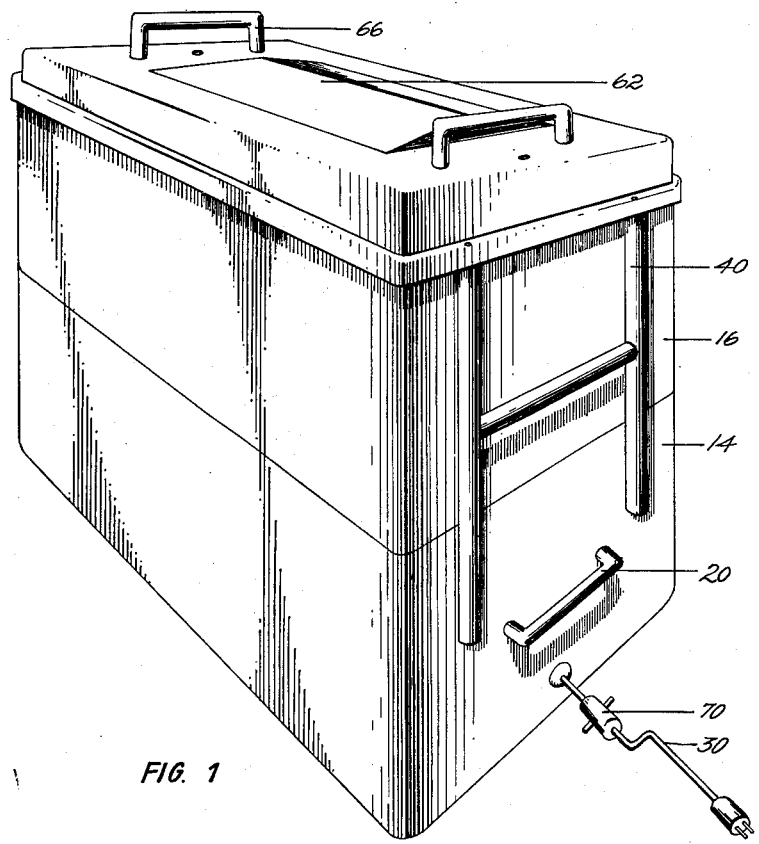
FIG. 1 is a front perspective view of the baster oven with riffled, transparent cover removably supported thereon.
Figure 2:
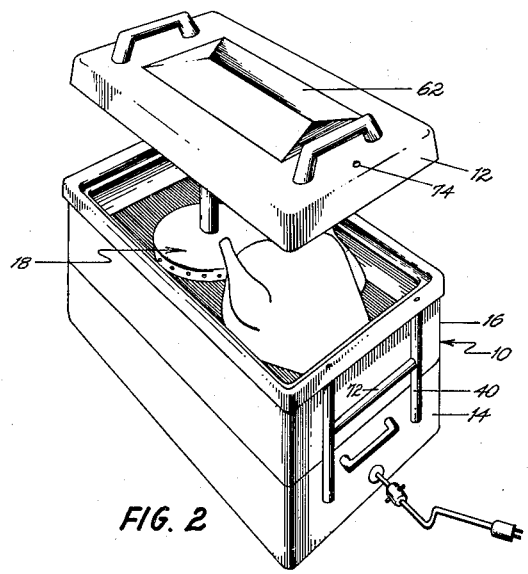
FIG. 2 is an end perspective of the baster oven with cover removed and showing a fowl supported for cooking adjacent the baster well.
Figure 3:
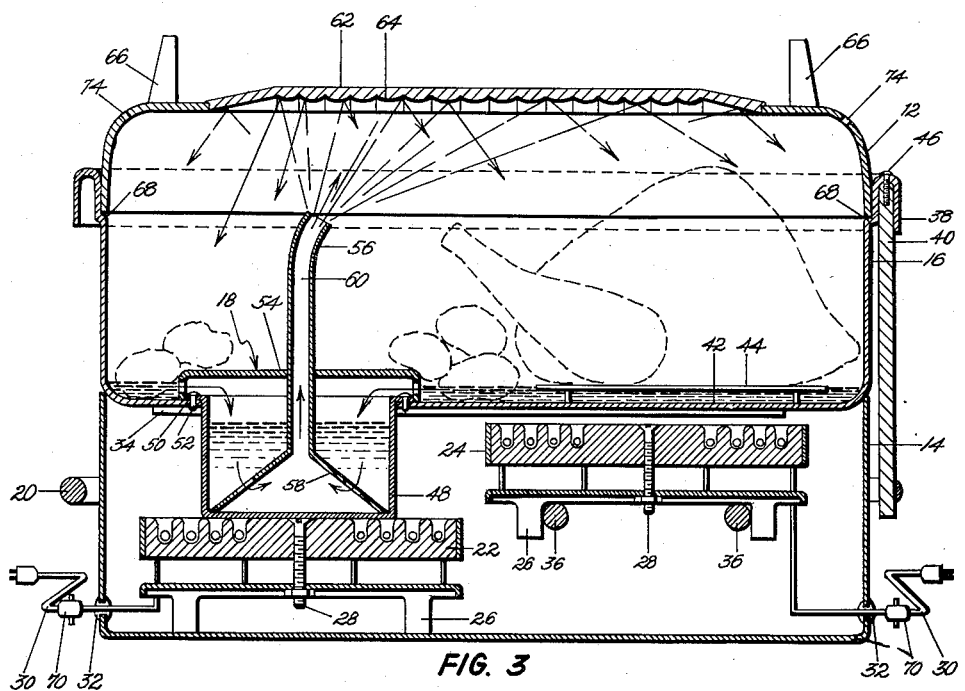
FIG. 3 is an enlarged longitudinal section of the baster oven, showing the baster well extending through the bottom of the heated container which is removably supported upon the base, containing two heating coils.

In FIGS. 1 and 2 baster oven 10 is represented as comprising heated container 16, defining a cooking area, and removably supported upon base heating means 14. As indicated in FIG. 3, top 12 which includes transparent portion 62, having riffles 64, and steam vents 74 may be removably supported within the top of heated element 16. Baster element 18 is shown as fixed extending through the floor of heated container 16.

Heating element 14, having handles 20 mounted at both exterior ends, interiorly supports baster well heating coil 22 and roaster heating coil 24. Both said heating coils may be mounted upon legs 26 by means of lock nut 28 and may be powered by means of extension cord 30 extending through bushing 32 in the end of base 14 and having appropriate switch means 70 appended thereto. Roaster heating coil 24 is mounted in proximity to the roasting end of heated container 16 by means of transverse struts 36 mounted between the sides of base heating means 14. Baster well heating coil 22 may rest upon base 14 floor so as to abut or be in close proximity to the baster well bottom.

Figure 4:
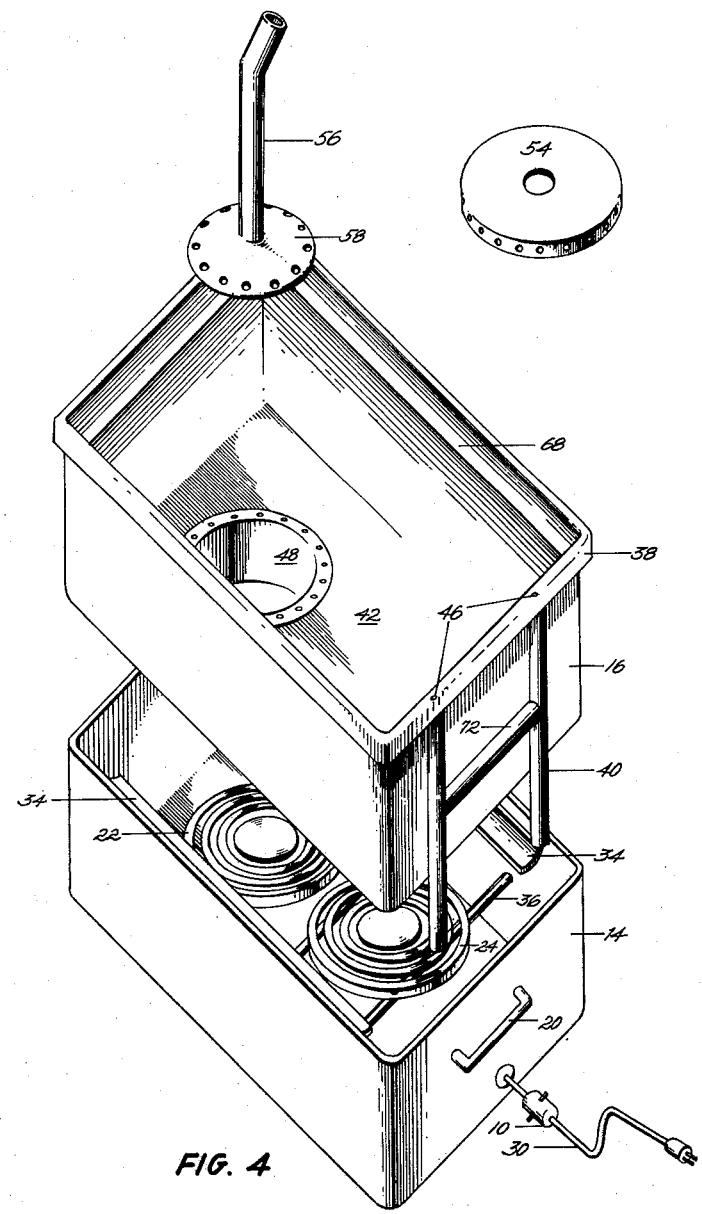
FIG. 4 is an enlarged perspective of the baster oven showing the heated container, defining the roasting area, in state of removal from the base and the baster discharge spout in state of removal from the baster well.

As illustrated in FIG. 4, base heating means 14 may have affixed at both sides longitudinal ledge supports 34, which support heated container 16. Heated container 16 may have at its top inner flange 68 which defines a ledge for removable support of cover 12. Heated container 16 outer flanges 38 are of inverted U-shaped cross section and facilitate carrying or removal of heated container 16. Legs 40 may be attached to flange 38 by means of set screw 46, weld or the like and depend from the end of heated container 16 opposite the baster well end. Legs 40 may be reinforced by transverse strut 72 and serve cooperatively with baster well 48 in levelly supporting heated container 16 in its state of removal from heating element 14. Baster well 48 is mounted in floor 42 of heated container 16 by means of well top flange 50 which overlies floor 42 surface and is fastened thereto by means of studs or rivets 52. Manifestly, well top flange 50 may have two or more radial slots (not illustrated) to facilitate return flowing of basting fluid from floor 42 into baster well 48. Well cover 54, having foramina at its vertical edges, is supported upon floor 42 so as to circumscribe and cover baster well 48. Discharge spout 56, having inner vertical channel 60, includes hollow base 58, is removably supported in the bottom of baster well 48 and extends through cover 54 into the cooking area.

As illustrated in FIG. 3, a fowl or like food to be cooked is supported apart from floor 42 by trivet means 44. Baster well 48 may be filled with basting fluid and even floor 42 may be covered with same. As baster well heating coil 22 heats the basting fluid in well 48, the steam generated forces basting fluid through channel 60 for discharge directly onto food being cooked and against top cover riffles 64 which deflect basting fluid onto the food being cooked. The basting fluid then flows over or percolates through the food being cooked, flows onto floor 42 and thence overflow-returns through cover 54 side foramina and into baster well 48 where it is redischarged for basting.

As will be apparent, the suggested construction provides conveniently for continuous and efficient basting of food during roasting. Manifestly, baster well 48 and its discharge spout 56 may be variously configured and disposed throughout the cooking area to achieve a similar effect. And various changes and modifications of construction may be adopted without departing from the spirt of the invention, as defined by the scope of the subjoined claims.

I claim:

1. In a baster oven, a cooking container having a removable lid and having a bottom wall with an area on which an article to be cooked is supported and having an opening at one side of said area, a base container having a bottom wall and open at the top and on which the cooking container is removably supported to close the top of the base container, a baster container having a bottom wall and open at the top and affixed at its upper edge in the opening in said bottom wall of the cooking container and extending downwardly into said base container, a cover for said baster container having a depending peripheral wall supported on the bottom wall of said cooking container in surrounding relation with said opening and closing the top of said baster container, said cover having openings in said peripheral wall for the gravitational flow of liquid from the bottom wall through said openings and into said baster container, an apertured hollow base mounted on the bottom wall of said baster container and having a discharge spout projecting through said cover with the upper end of said spout directed to discharge above said area on which the article to be cooked is supported, an electrical heating element arranged in said base container below said area of the cooking container on which the article is supported, an electrical heating element arranged in said base container below said baster container, electrical conductor means connected with said heating elements for connection with a source of electrical potential, and means for independently heating said heating elements.

2. In a baster oven as set forth in claim 1, in which said cooking container has a depending leg affixed thereto at the end remote from said baster container with the lower end of said leg being substantially at the same level as the bottom wall of said baster container and cooperating with said baster container for supporting the cooking container when removed from said base container, and in which said base container supports said heating elements in proximity to the bottom wall of the baster container and said area of the bottom wall of the cooking container on which the article to be cooked is supported respectively.

References Cited in the file of this patent

UNITED STATES PATENTS

| | | |
|---|---|---|
| 1,977,486 | Louis | Oct. 16, 1934 |
| 2,010,915 | Carpenter | Aug. 13, 1935 |
| 2,352,292 | Schaefer | June 27, 1944 |
| 2,548,325 | Smith | Apr. 10, 1951 |
| 2,560,605 | Shell | July 17, 1951 |
| 2,731,539 | Pavelka | Jan. 17, 1956 |
| 2,949,525 | Dunn | Aug. 16, 1960 |